United States Patent
Kujak et al.

(10) Patent No.: US 11,053,990 B2
(45) Date of Patent: Jul. 6, 2021

(54) SYSTEMS AND METHODS FOR A TWO-WAY CLUTCH WITH A PREDETERMINED INTERFERENCE

(71) Applicant: HUSCO AUTOMOTIVE HOLDINGS LLC, Waukesha, WI (US)

(72) Inventors: Michael Kujak, Hartland, WI (US); Allen Tewes, Spirit Lake, IA (US); Austin Schmitt, Hartland, WI (US)

(73) Assignee: HUSCO Automotive Holdings LLC, Waukesha, WI (US)

( * ) Notice: Subject to any disclaimer, the term of this patent is extended or adjusted under 35 U.S.C. 154(b) by 0 days.

(21) Appl. No.: 16/225,241

(22) Filed: Dec. 19, 2018

(65) Prior Publication Data

US 2019/0186557 A1 Jun. 20, 2019

Related U.S. Application Data

(60) Provisional application No. 62/607,570, filed on Dec. 19, 2017.

(51) Int. Cl.
*F16D 3/10* (2006.01)
*F16D 41/064* (2006.01)
(Continued)

(52) U.S. Cl.
CPC ........ *F16D 41/064* (2013.01); *F01L 1/34409* (2013.01); *F16D 3/10* (2013.01);
(Continued)

(58) Field of Classification Search
CPC ........ F16D 41/064; F16D 3/10; F16D 41/067; F16D 15/00; F16D 2023/0618; F16D 23/06; F01L 1/34409
See application file for complete search history.

(56) References Cited

U.S. PATENT DOCUMENTS 5,235,941 A * 8/1993 Hampton .................. F16D 3/10
123/90.17
5,337,711 A * 8/1994 Hampton ............ F01L 1/34409
123/90.17
(Continued)

FOREIGN PATENT DOCUMENTS

JP 2010001887 1/2010

OTHER PUBLICATIONS

European Patent Office Search Report, dated Feb. 4, 2019, 7 pages.

*Primary Examiner* — David J Hlavka
(74) *Attorney, Agent, or Firm* — Quarles & Brady LLP

(57) ABSTRACT

Systems and method for a two-way clutch are provided. In some configurations, the two-way clutch includes a driven member having a first mating surface, a drive member having a second mating surface, and a locking mechanism arranged between the first mating surface and the second mating surface. The locking mechanism is operable to contact the first mating surface and the second mating surface, in response to an outside force applied to the drive member that loads the locking mechanism. The two-way clutch further includes an engaging member. The engaging member provides a predetermined interference on the locking mechanism to hold the locking mechanism off of at least one of the first mating surface and the second mating surface, when the locking mechanism is in an unloaded state.

19 Claims, 3 Drawing Sheets

(51) Int. Cl.
*F16D 15/00* (2006.01)
*F16D 41/067* (2006.01)
*F01L 1/344* (2006.01)
*F16D 23/06* (2006.01)

(52) U.S. Cl.
CPC .......... F16D 15/00 (2013.01); F16D 41/067 (2013.01); *F16D 23/06* (2013.01); *F16D 2023/0618* (2013.01)

(56) References Cited

U.S. PATENT DOCUMENTS

| | | | |
|---|---|---|---|
| 6,192,842 B1 * | 2/2001 | Haag | F01L 1/3442 123/90.17 |
| 7,086,359 B2 * | 8/2006 | Hayase | F01L 1/34409 123/90.15 |
| 10,072,537 B2 | 9/2018 | Schmitt | |
| 2017/0159735 A1 * | 6/2017 | Rguichi | F16D 65/568 |

* cited by examiner

SYSTEMS AND METHODS FOR A TWO-WAY CLUTCH WITH A PREDETERMINED INTERFERENCE

CROSS-REFERENCES TO RELATED APPLICATIONS

This application is based on, claims priority to, and incorporates herein by reference in its entirety U.S. Provisional Patent Application No. 62/607,570, filed on Dec. 19, 2017, and entitled "Systems and Methods for a Two-Way Clutch with a Predetermined Interference."

STATEMENT REGARDING FEDERALLY SPONSORED RESEARCH

Not Applicable.

BACKGROUND

Conventional two-way clutches can include a driven member and a drive member that may bi-directionally displace along with, or relative to, the driven member. In some applications, a two-way clutch can selectively transition between modes where the driven member and the drive member move in unison, and where the drive member is allowed to move relative to the driven member.

BRIEF SUMMARY

The present disclosure relates generally to two-way clutches and, in particular, to two-way clutches with a predetermined interference applied to a locking mechanism.

In one aspect, the present disclosure provides a two-way clutch that includes a driven member, a drive member, and a locking mechanism operable to contact the driven member and the drive member, in response to an outside force applied to the drive member that loads the locking mechanism. The two-way clutch further includes an engaging member. When the locking mechanism is in an unloaded state, the engaging member contacts the locking mechanism to provide a predetermined interference that biases the locking mechanism out of engagement with at least one of the driven member and the drive member.

In one aspect, the present disclosure provides a two-way clutch that includes a driven member having a first mating surface, a drive member having a second mating surface, and a locking mechanism arranged between the first mating surface and the second mating surface. The locking mechanism is operable to contact the first mating surface and the second mating surface, in response to an outside force applied to the drive member that loads the locking mechanism. The two-way clutch further includes an engaging member. The engaging member provides a predetermined interference on the locking mechanism to hold the locking mechanism off of at least one of the first mating surface and the second mating surface, when the locking mechanism is in an unloaded state.

In another aspect, the present disclosure provides a cam phasing system configured to selectively vary a rotational relationship between a crankshaft and a camshaft of an internal combustion engine. The cam phasing system includes a driven component rotatably coupled to the crankshaft, a drive component rotatably coupled to the camshaft, and a locking mechanism operable to contact the driven component and the drive component, in response to a torque pulse applied to the camshaft that loads the locking mechanism. The cam phasing system further includes an engaging member. The engaging member provides a predetermined interference on the locking mechanism to hold the locking mechanism off of at least one of the driven component and the drive component, when the locking mechanism is in an unloaded state.

In another aspect, the present disclosure provides a method for reducing an input force required to actuate a cam phasing system. The mechanical cam phasing system is configured to selectively vary a rotational relationship between a crankshaft and a camshaft of an internal combustion engine and includes a driven member, a drive member, a locking mechanism, and an engaging member. The engaging member is configured to selectively displace the locking mechanism. The method includes rotatably coupling a driven member to the crankshaft, rotatably coupling a drive member to the camshaft, and providing predetermined interference on a locking mechanism, via the engaging member, such that a gap exists between the locking mechanism and at least one of the driven member and the drive member in an unloaded state, thereby reducing an input force required to act on the engaging member to displace the locking mechanism and actuate the cam phasing system.

The foregoing and other aspects and advantages of the disclosure will appear from the following description. In the description, reference is made to the accompanying drawings which form a part hereof, and in which there is shown by way of illustration a preferred configuration of the disclosure. Such configuration does not necessarily represent the full scope of the disclosure, however, and reference is made therefore to the claims and herein for interpreting the scope of the disclosure.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

DETAILED DESCRIPTION

Figure 1:
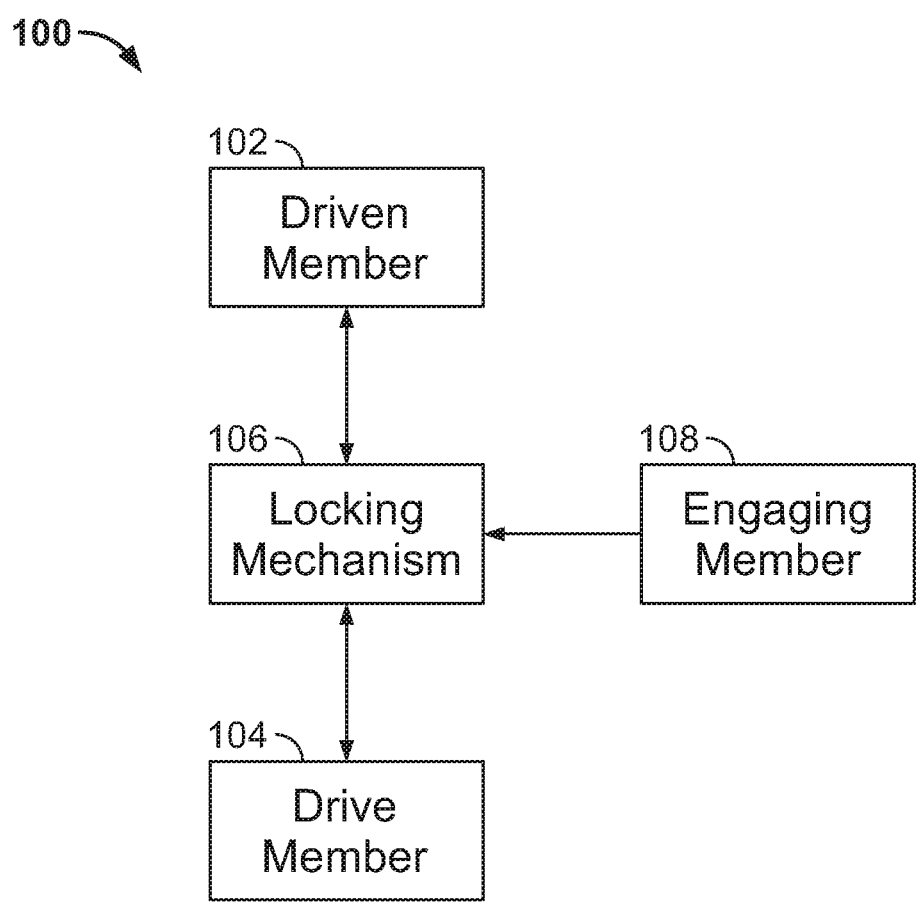
FIG. 1 is a schematic illustration of a two-way clutch according to one aspect of the present disclosure.

FIG. 1 illustrates a non-limiting example of a two-way clutch 100 according to the present disclosure. The two-way clutch 100 includes a driven member 102, a drive member, 104, a locking mechanism 106, and an engaging member 108. In some non-limiting examples, the driven member 102 may be coupled to a device that is configured to input energy thereto, such that the driven member 102 travels in unison with the device. For example, the driven member 102 may be coupled to a motor (e.g., an electric motor, an internal combustion engine, etc.) for rotation therewith. The drive member 104 may be coupled to another component that is also coupled to the device, which drives the driven member 102, but may be allowed to displace with or relative to the driven member 102.

Generally, the locking mechanism 106 may be arranged between the driven member 102 and the drive member 104. The locking mechanism 106 may be configured to selectively allow relative motion between the driven member 102 and the drive member 104. For example, the locking mechanism 106 may be movable between a locked position and an unlocked position. In the unlocked position, the locking mechanism 106 may allow the drive member 104 to displace a predetermined amount relative to the driven member 102 in a desired direction. In the locked state, the locking mechanism 106 may inhibit relative motion between the driven member 102 and the drive member 104.

In some non-limiting examples, the engaging member 108 is in engagement with the locking mechanism 106 and may be movable independent of the driven member 102 and the drive member 104. For example, the engaging member 108 may be selectively movable in response to an input force applied by an input mechanism (e.g., an actuator) coupled thereto. The engaging member 108 may be selectively displaced (e.g., via the input mechanism) and, in response, the engaging member 108 may engage and displace the locking mechanism 106 in a desired direction to transition the locking mechanism 106 between the locked position and the unlocked position.

In operation, the drive member 104 may be subjected to an outside force that applies a load onto the locking mechanism 106. For example, a component of the device to which the drive member 104 is coupled may exert the outside force on the drive member 104. In some non-limiting examples, the outside force may occur in more than one direction. In some non-limiting examples, the outside force may be cyclically applied to the drive member 104 with an alternating direction and magnitude.

In some non-limiting examples, when the outside force is exerted on the drive member 104, the corresponding load applied to the locking mechanism 106 can compress the locking mechanism 106 between the driven member 102 and the drive member 104. This compression applied to the locking mechanism 106 may substantially prevent the locking mechanism 106 from being transitioned, for example, by the engaging member 108 between the locked and unlocked positions. That is, the compression of the locking mechanism 106 between the driven member 102 and the drive member 104 can effectively "lock" the locking mechanism 106 and substantially prevent the engaging member 108 from selectively displacing the locking mechanism 106. Thus, for certain operating conditions, the outside force applied to the drive member 104 may place the locking mechanism 106 in a loaded state in which the engaging member 108 is substantially prevented from selectively displacing the locking mechanism 106 and transitioning the locking mechanism 106 between the locked and unlocked positions.

In some non-limiting examples, the compression of the locking mechanism 106 resulting from the outside force on the drive member 104 may require a prohibitively large input force applied to the engaging member 108 by the input mechanism. The compression of the locking mechanism 106 in the loaded state increases the amount of force required to displace the locking mechanism 106. In general, a cost associated with the input mechanism is exponentially related to the amount of input force provided thereby. As such, the increased force required to displace the locking mechanism 106 in the loaded state may present a significantly increased cost associated with operating the two-way clutch 100.

In general, the present disclosure provides a predetermined interference that may be applied to the locking mechanism 106 to combat the undesired "locking" thereof in the loaded state and the associated increased input force requirements for the engaging member 108. In some non-limiting examples, the engaging member 108 may be placed in engagement with the locking mechanism 106, such that the engaging member 108 provides a predetermined interference to the locking mechanism 106. For example, the engaging member 108 may be designed to provide the predetermined interference on the locking mechanism 106, when the locking mechanism 106 is in an unloaded state (i.e., the outside force is not applied to the drive member 104). In some non-limiting examples, the predetermined interference provided by the engaging member 108 may displace the locking mechanism 106 away from at least one of the driven member 102 and the drive member 104 such that a gap exists therebetween. In some non-limiting examples, the predetermined interference provided by the engaging member 108 may displace the locking mechanism 106 away from both of the driven member 102 and the drive member 104 such that a gap exists therebetween.

The predetermined interference provided on the locking mechanism 106 can make it much easier to displace the locking mechanism 106 in a desired direction (e.g., to transition the locking mechanism 106 between the unlocked and locked positions), which results in a reduced input force required to displace the engaging member 108 and thereby a reduced input force to achieve relative movement between the driven member 102 and the drive member 104. In addition, the predetermined interference can ensure that the locking mechanism 106 is capable of being displaced (i.e., not "locked" by the compression of the outside force) for a substantial portion of the outside force profile. In this way, the predetermined interference can make operation of the two-way clutch 100 more efficient (e.g., by reducing the required input force and making it easier to displace the locking mechanism 106).

FIGS. 2A-D illustrate one non-limiting configuration of the two-way clutch 100 in a rotating two-way clutch application. In the illustrated non-limiting example, the two-way clutch 100 includes the driven member 102, the drive member 106, the locking mechanism 106, and the engaging member 108. In some non-limiting examples, the two-way clutch 100 may be applied in a mechanical cam phasing application. For example, the driven member 102 may be rotatably coupled to a crankshaft on an internal combustion engine, and the drive member 104 may be rotatably coupled to a camshaft on an internal combustion engine. In some non-limiting examples, the engaging member 108 may be coupled to an actuator (not shown) configured to provide an input force thereto. In application, the actuator may be configured to apply the input force to the engaging member 108 to displace the engaging member 108 into the locking mechanism 106 (e.g., relative to the driven member 102) a predetermined amount or distance. The resulting displacement of the locking mechanism 106 may allow the drive member 104 to rotate relative to the driven member 102 (i.e., the camshaft can rotate relative to the crankshaft) in a desired direction to achieve a desired amount of cam phasing (i.e., a rotational offset between the camshaft and the crankshaft).

It should be appreciated that the techniques and properties of the two-way clutch 100 described herein may be applied to other rotational and linear two-way clutching applications and the present disclosure is not limited to a mechanical cam phasing application.

In the illustrated non-limiting example, the driven member 102 can include a first mating surface 110 arranged adjacent to the locking mechanism 106. The drive member 104 can include a second mating surface 112 arranged adjacent to the locking mechanism 106. In the illustrated non-limiting example, the locking mechanism 106 may be arranged between the first mating surface 110 and the second mating surface 112. The locking mechanism 106 can include a first locking member 114 and a second locking member 116 biased apart from one another by a biasing element 118. In some non-limiting examples, the first and second locking members 114 and 116 may be in the form of bearings. In some non-limiting examples, the first and second locking members 114 and 116 may be in the form of roller bearings. In some non-limiting examples, the first and second locking members 114 and 116 may take any form configured to conform to a cavity between the first mating surface 110 and the second mating surface 112, or capable of wedging therebetween.

One non-limiting example of the operation of the two-way clutch 100 in a mechanical cam phasing application will be described with reference to FIGS. 2A-D. Generally, during operation, outside forces may be exerted on the drive member 104. For example, the drive member 104 may be subjected to cam torque pulses originating from the intake and exhaust valves acting on the camshaft. The cam torque pulses acting on the drive member 104 may vary in direction and magnitude (e.g., cyclically) during operation of the internal combustion engine.

Figure 2A:
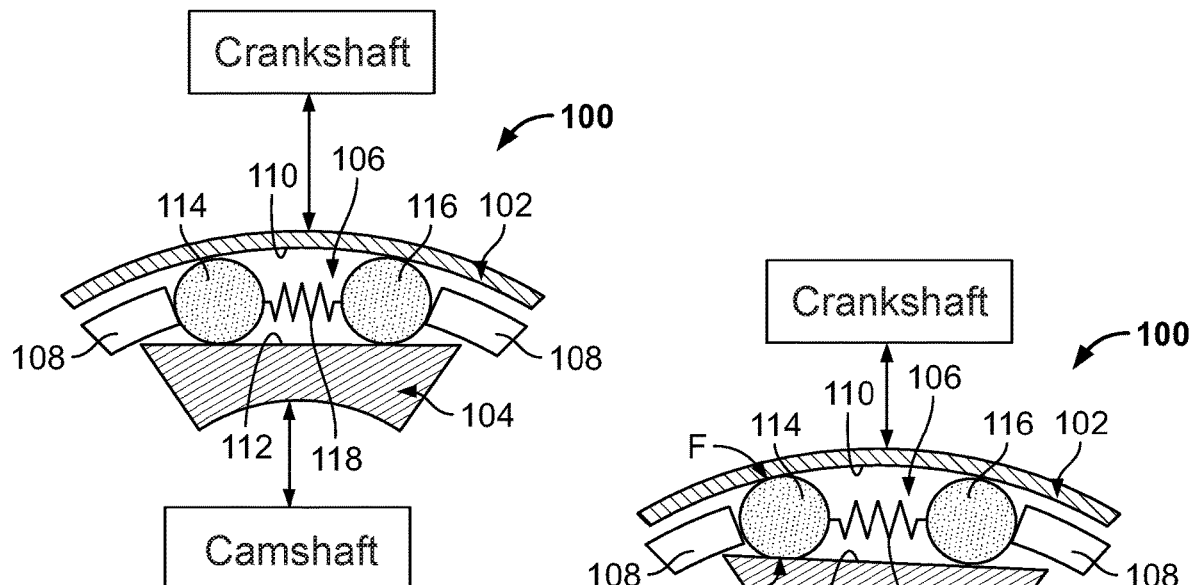
FIG. 2A is a schematic illustration of a two-way clutch with a predetermined interference applied to a locking mechanism and with the locking mechanism in an unloaded state according to one aspect of the present disclosure.

FIG. 2A illustrates the two-way clutch 100 with the locking mechanism 106 in an unloaded state. That is, there is no outside force (e.g., cam torque pulse) applied to the drive member 104. With the locking mechanism 106 in the unloaded state, the engaging member 108 is designed to engage the locking mechanism 106 such that a predetermined interference is applied thereto. For example, the engaging member 108 can displace the first locking member 114 and the second locking member 116 away from (e.g., out of engagement with) at least one of the first mating surface 110 and the second mating surface 112. In this way, for example, both of the first and second locking members 114 and 116 may be is capable of being displaced (i.e., not "locked") by the engaging member 108. In some non-limiting examples, the predetermined interference may provide a gap between the first locking member 114 and the second locking member 116 and at least one of the first mating surface 110 and the second mating surface 112. In some non-limiting examples, the predetermined interference may provide a gap between the first locking member 114 and the second locking member 116 and both of the first mating surface 110 and the second mating surface 112.

In any case, the predetermined interference provided by the engaging member 108 can reduce an input force required to be applied on the engaging member 108 to displace one of the first locking member 114 and the second locking member 116. For example, by providing a gap between the first and second locking members 114 and 116 and at least one of the first mating surface 110 and the second mating surface 112, a static friction between the first and second locking members 114 and 116 and at least one of the first mating surface 110 and the second mating surface 112 is removed. Thus, a static friction needed to be overcome prior to displacing one of the first and second locking members 114 and 116 is reduced by the predetermined interference (e.g., when compared to convention two-way clutches where the locking members are in contact with both mating surfaces prior to displacement).

Figure 2B:
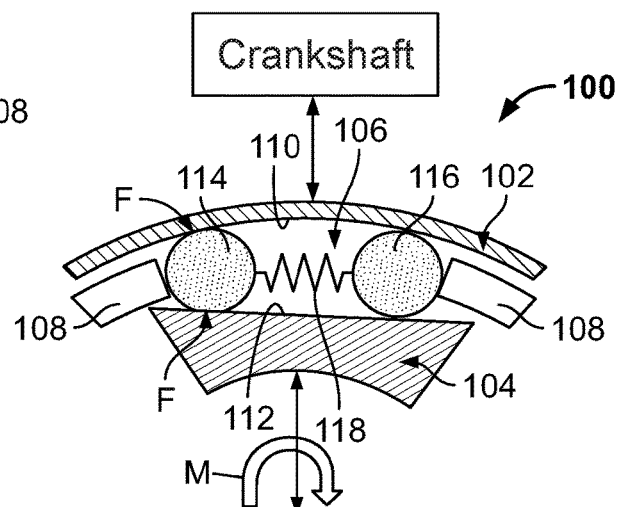
FIG. 2B is a schematic illustration of the two-way clutch of FIG. 2A with an outside force applied in a first direction and a first locking member of the locking mechanism in a compressed state.

During operation, an outside force may be applied to the drive member 104 in a first direction, as illustrated in FIG. 2B. In the illustrated non-limiting example, the outside force may be a torque pulse acting on the drive member 104 in a clockwise direction. When the outside force is applied to the drive member 104 in the first direction, compressive forces F may apply load to the first locking member 114. For example, the compressive forces F may result from contact between the first locking member 114 and both of the first mating surface 110 and the second mating surface 112. The compressive forces applied to the first locking member 114 as a result of the outside force on the drive member 104 may "lock" the first locking member 114. That is, the first locking member 114 may be substantially prevented from being displaced by the engaging member 108, and relative rotation between the driven member 102 and the drive member 104 may be prevented in the first direction. The second locking member 116, however, may be supported by the engaging member 108 and the predetermined interference provided thereby can maintain a clearance, or gap, between the second locking member 116 and at least one of the first mating surface 110 and the second mating surface 112. Thus, the predetermined interference can maintain the second locking member 116 in an "unlocked" state, where it is not compressed between the first and second mating surfaces 110 and 112 and still easily displaced by the engaging member 108, if desired. In this way, for example, relative rotation between the driven member 102 and the drive member 104 may be allowable (e.g., if the engaging member 108 is moved relative to the drive member 102) in a second direction opposite to the first direction.

Figure 2C:
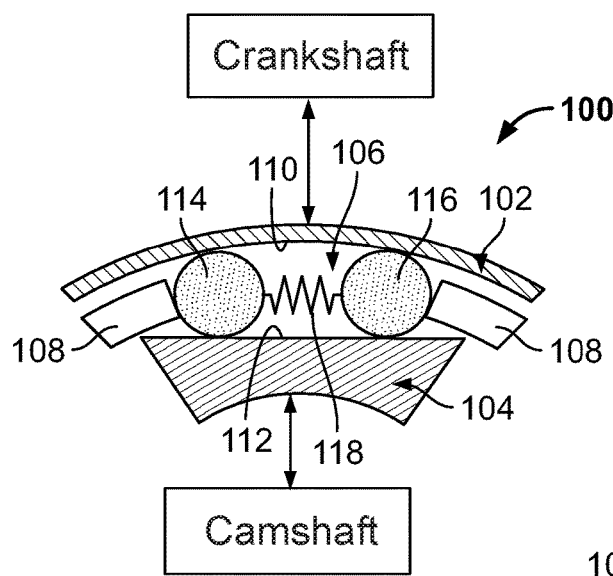
FIG. 2C is a schematic illustration of the two-way clutch of FIG. 2B with the outside force in the first direction removed and the locking mechanism in an unloaded state.

FIG. 2C illustrates the two-way clutch 100 once the outside force applied to the drive member 104 in the first direction is removed. With the outside force removed, the compressive forces on the first locking member 114 can be removed and the locking mechanism 106 may return to the unloaded state. Thus, the first locking member 114 can return to a state where it is capable of being displaced by the engaging member 108.

Figure 2D:
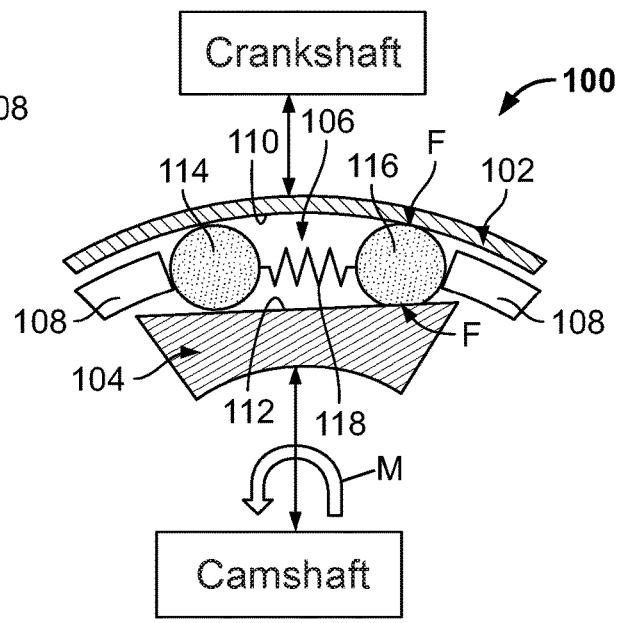
FIG. 2D is a schematic illustration of the two-way clutch of FIG. 2A with an outside force applied in a second direction and a second member of the locking mechanism in a compressed state.

During operation, an outside force may be applied to the drive member 104 in a second direction, as illustrated in FIG. 2D. In some non-limiting examples, the outside force in the second direction may occur at a different time than the outside force in the first direction (FIG. 2B). In some non-limiting examples, the outside force applied to the drive member 104 may be cyclic in magnitude and direction. In the illustrated non-limiting example, the outside force may be a torque pulse acting on the drive member 104 in a counterclockwise direction. When the outside force is applied to the drive member 104 in the second direction, compressive forces F may apply load to the second locking member 116. For example, the compressive forces F may result from contact between the second locking member 116 and both of the first mating surface 110 and the second mating surface 112. The compressive forces applied to the second locking member 116 as a result of the outside force on the drive member 104 may "lock" the second locking member 116. That is, the second locking member 116 may be substantially prevented from being displaced by the engaging member 108, and relative rotation between the driven member 102 and the drive member 104 may be prevented in the second direction. The first locking member 114, however, may be supported by the engaging member 108 and the predetermined interference provided thereby can maintain a clearance, or gap, between the first locking member 114 and at least one of the first mating surface 110 and the second mating surface 112. Thus, the predetermined interference can maintain the first locking member 114 in an "unlocked" state, where it is not compressed between the first and second mating surfaces 110 and 112 and still easily displaced by the engaging member 108, if desired. In this way, for example, relative rotation between the driven member 102 and the drive member 104 may be allowable (e.g., if the engaging member 108 is moved relative to the drive member 102) in a second direction opposite to the first direction.

As illustrated in FIGS. 2A-2D, the predetermined interference provided on the locking mechanism 106 by the engaging member 108 may maintain each of the first locking member 114 and the second locking member 116 "unlocked," or capable of being displaced, for example, at least half of the outside force cycle. That is, the first locking member 114 may be maintained in the "unlocked" state during outside forces in the second direction, and the second locking member 116 may be maintained in the "unlocked" state during outside forces in the first direction. In this way, the input force requirements of the engaging member 108, for example, to allow relative rotation between the driven member 102 and the drive member 104 may be significantly reduced when compared to conventional two-way clutches, or mechanical cam phasing systems.

FIGS. 3A-D illustrate one non-limiting example of a convention two-way clutch 200. Similar components between the two-way clutch 100 and the convention two-way clutch 200 are identified using like reference numerals in the 200's. As illustrated in FIGS. 3A-D, the conventional two-way clutch 200 does not apply a predetermined interference on the locking mechanism 206. The lack of a predetermined interference may lead to the locking mechanism 206 being "locked," or substantially inhibited from being displaced by the engaging member 208 for most of the outside force cycle.

Figure 3A:
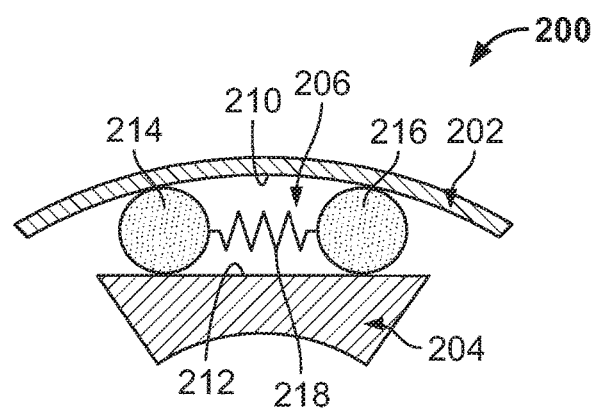
FIG. 3A is a schematic illustration of a conventional two-way clutch without a predetermined interference with a locking mechanism in an unloaded state.
Figure 3B:
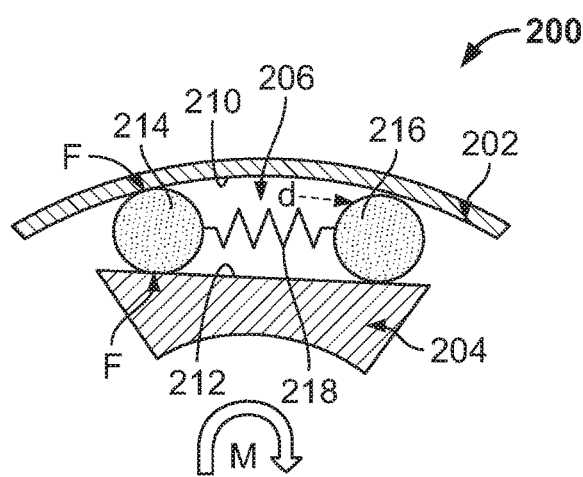
FIG. 3B is a schematic illustration of the conventional two-way clutch of FIG. 3A with an outside force applied in a first direction and a first locking member of the locking mechanism in a compressed state.
Figure 3C:
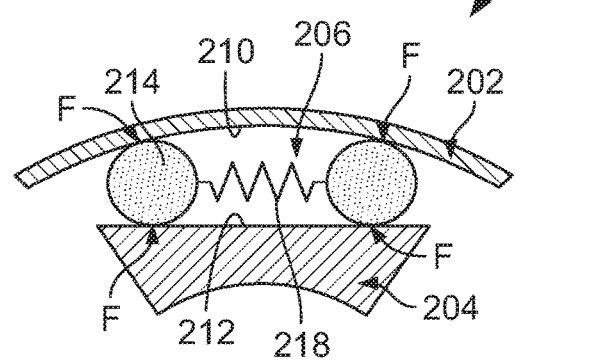
FIG. 3C is a schematic illustration of the conventional two-way clutch of FIG. 3B with the outside force in the first direction removed and the locking mechanism in a compressed state.
Figure 3D:
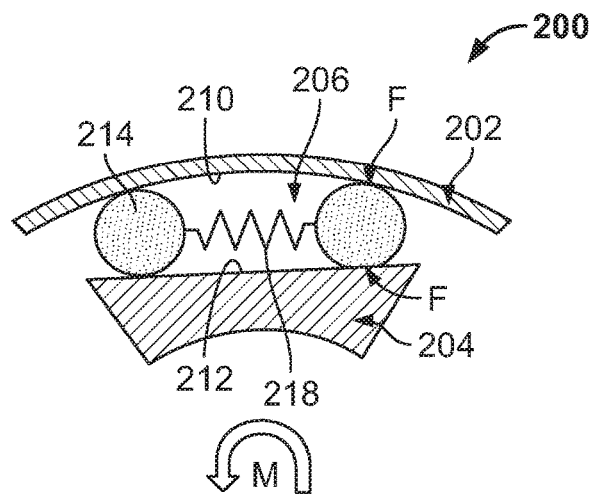
FIG. 3D is a schematic illustration of the conventional two-way clutch of FIG. 3A with an outside force applied in a second direction and a second locking member of the locking mechanism in a compressed state.

For example, as locking mechanism 206 transitions from the unloaded state (FIG. 3A) to a state where an outside force is applied to the drive member 204 (FIG. 3B), compressive forces F may be applied to the first locking member 114, thereby "locking" the first locking member 114 between the first mating surface 210 and the second mating surface 212. At substantially the same time, the biasing element 218 can push the second locking member 216 into contact with the first mating surface 210 and the second mating surface 212, giving it a displacement d. Therefore, as the outside force is removed (FIG. 3C), the compressive forces on the first locking member 214 are reduced, but the second locking member 216 displaced into a position where it is subjected to compressive forces F. As illustrated in FIG. 3C, once the outside force is removed, both of the first locking member 214 and the second locking member 216 may be subjected to compressive forces, which "lock," or substantially prevent the first and second locking members 214 and 216 from being displaced. With some compressive forces being applied to both of the first and second locking members 214 and 216, a substantially increased input force may be required to displace either the first locking member 214 or the second locking member 216.

When an outside force is applied to the drive member 204 in a second direction (FIG. 3D), compressive forces F can "lock" the second locking member 216. The first locking member 214 may eventually be "unlocked," but this will only occur for extremely high magnitudes of the outside force, which may last for only short time periods. In particular, in a cam phasing application, the highest torque pulses typically last for very short periods of time in most engine applications.

Thus, the application of a predetermined interference on the locking mechanism of a two-way clutch may provide significant advantages over conventional two-way clutches. For example, the predetermined interference can reduce an input force required to enable relative displacement between a driven member and a drive member. Alternatively or additionally, the predetermined interference can facilitate efficient transitions between operating modes of the two-way clutch (e.g., a locked state where relative rotation between the drive and driven members is inhibited and an unlocked state where relative rotation between the drive and driven members is enabled). In applications where a cyclic outside force may be applied to a drive member of the two-way clutch, the predetermined interference can ensure that the locking mechanism is capable of displacing in a direction opposite to the outside force.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Thus, while the invention has been described in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

We claim:
1. A two-way clutch comprising:
a driven member;
a drive member capable of being subjected to an outside force in the form of a torque pulse cycle;
a locking mechanism including a first locking member and a second locking member, wherein the outside force is configured to cyclically compress the first locking member or the second locking member between the driven member and the drive member; and an engaging member configured to selectively engage and displace the first locking member or the second locking member to enable relative rotation between the driven member and the drive member, wherein the engaging member is configured to provide a predetermined interference on the first locking member and the second locking member that biases the first locking member, the second locking member, or both of the first locking member and the second locking member out of engagement with at least one of the driven member and the drive member and prevents the first locking member and the second locking member from being simultaneously compressed between the driven member and the drive member during the torque pulse cycle.

2. The two-way clutch of claim 1, wherein the driven member includes a first mating surface and the drive member includes a second mating surface.

3. The two-way clutch of claim 2, wherein the locking mechanism is arranged between the first mating surface and the second mating surface.

4. The two-way clutch of claim 3, wherein the predetermined interference provides a gap between the locking mechanism and at least one of the first mating surface and the second mating surface.

5. The two-way clutch of claim 1, wherein the driven member is rotatably coupled to a crankshaft on an internal combustion engine, and the drive member is rotatably coupled to a camshaft on the internal combustion engine.

6. The two-way clutch of claim 1, wherein the locking mechanism comprises one or more bearings.

7. The two-way clutch of claim 1, wherein the first locking member and the second locking member are biased away from one another by a biasing element.

8. The two-way clutch of claim 7, wherein the first locking member and the second locking member are in the form of a roller bearing.

9. The two-way clutch of claim 1, wherein the predetermined interference is configured to maintain the first locking member, the second locking member, or both the first locking member and the second locking member in an unlocked state during the torque pulse cycle.

10. The two-way clutch of claim 9, wherein the first locking member or the second locking member is capable of being engaged and displaced by the engaging member in the unlocked state to enable relative rotation between the driven member and the drive member.

11. A two-way clutch comprising:
a driven member including a first mating surface;
a drive member including a second mating surface, wherein the drive member is capable of being subjected to an outside force in the form of a torque pulse cycle;
a locking mechanism arranged between the first mating surface and the second mating surface and including a first locking member and a second locking member; and an engaging member configured to selectively engage and displace the first locking member or the second locking member to enable relative rotation between the driven member and the drive member, and wherein the engaging member is configured to provide a predetermined interference on the locking mechanism to hold the first locking member, the second locking member, or both the first and second locking members off of at least one of the first mating surface and the second mating surface, thereby maintaining the first locking member, the second locking member, or both the first and second locking members in an unlocked state, where compressive forces from the torque pulse cycle are prevented from compressing the first locking member, the second locking member, or both the first and second locking members, during the torque pulse cycle.

12. The two-way clutch of claim 11, wherein the predetermined interference provides a gap between the locking mechanism and at least one of the first mating surface and the second mating surface.

13. The two-way clutch of claim 11, wherein the driven member is rotatably coupled to a crankshaft on an internal combustion engine, and the drive member is rotatably coupled to a camshaft on the internal combustion engine.

14. The two-way clutch of claim 11, wherein the locking mechanism comprises one or more bearings.

15. The two-way clutch of claim 11, wherein the first locking member and the second locking member are biased away from one another by a biasing element.

16. The two-way clutch of claim 15, wherein the first locking member and the second locking member are in the form of a roller bearing.

17. The two-way clutch of claim 11, wherein the first locking member or the second locking member is capable of being engaged and displaced by the engaging member in the unlocked state to enable relative rotation between the driven member and the drive member.

18. The two-way clutch of claim 11, wherein the torque pulse cycle is configured to cyclically transition the locking mechanism between a loaded state where the first locking member or the second locking member is compressed between the first mating surface and the second mating surface and an unloaded state.

19. The two-way clutch of claim 11, wherein the predetermined interference is configured to prevent both the first and second locking members from being simultaneously compressed between the first mating surface and the second mating surface during the torque pulse cycle.

* * * * *